March 8, 1927. 1,620,597
P. F. M. A. FONTANA
VULCANIZER
Filed Nov. 19, 1925

INVENTOR
PAUL F.M.A. FONTANA
BY
ATTORNEYS

Patented Mar. 8, 1927.

1,620,597

UNITED STATES PATENT OFFICE.

PAUL FRANÇOIS MARC ALBERT FONTANA, OF CLUSES, FRANCE, ASSIGNOR TO SOCIETE DES APPAREILS MEPHISTO JULES MANFREDI & CIE., OF CLUSES, FRANCE.

VULCANIZER.

Application filed November 19, 1925, Serial No. 70,143, and in France June 25, 1925.

This invention has for its object to provide an apparatus lighted and heated automatically for the vulcanization of air-tubes for the tyres of motor cars, motor-cycles and cycles and concerns repairing elements each comprising a rubber patch impregnated with sulphur and arranged under a metal cup containing a washer of nitrate of potash, these elements being characterized by the fact that they are provided over their entire upper surface with ignition products, such as nitrate of potash and amorphous phosphorus, this cup being closed by a varnished piece of cardboard impregnated with paraffin and which covers the said cup.

The invention is characterized by an ignition device for this combustible mixture, comprising two tubes diametrically arranged, containing ferro-cerium, though of course other suitable spark producing elements may be used, and a steel cut out rod passing between them and acting as a striker. By striking a blow on this striker, two gerbs of sparks are obtained in a completely free space, this ensuring the efficiency of the ignition.

The invention is further characterized by a press comprising a small fixed table and a claw with multiple fingers which can press upon the periphery of the metal cup. This claw is so mounted that it can be easily inclined in any direction according to the inequalities in thickness of the members placed in the apparatus. It is actuated by a screw having a double screw-thread, permitting to rapidly move the claw towards and from the cup.

Finally the under side of the small table is provided with ribs permitting, at will, to lay the apparatus flatwise on a table or on the ground, or to secure it in a vise.

The invention is illustrated, by way of example only, in the accompanying drawing in which.

Figure 5:
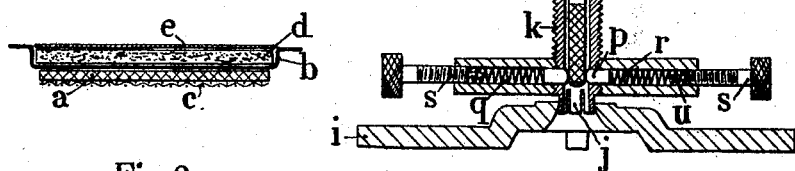
Fig. 5 is a sectional view showing a repairing element.
Figure 6:
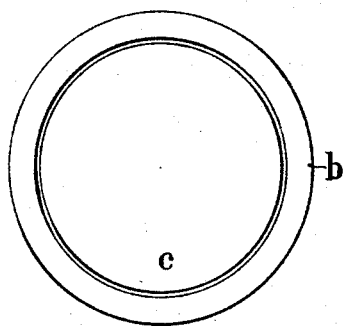
Fig. 6 is a corresponding plan view.
Figure 7:
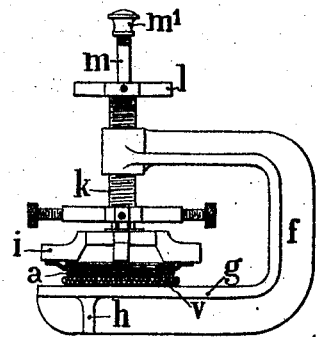
Fig. 7 is a view similar to Fig. 1, showing the operation.

As illustrated in the drawing, the repairs are effected by means of elements such as illustrated in Figs. 5 and 6. Each of these elements comprises a rubber patch $a$ made of pure para, having the required shape; round, oval, etc. This rubber contains a certain quantity of sulphur so that it can be vulcanized. This patch is secured by means of glue under a metal cup $b$ having the same shape. It is covered with a piece of canvas $c$ which protects it before use.

Within the cup is placed a composition capable of burning during a predetermined time by producing a rise in temperature also predetermined. This composition is, preferably, obtained by impregnating a washer of straw-board $d$ with nitrate of potash and by covering the entire surface with nitrate of potash and amorphous phosphorus. Before use, this composition is sheltered from the air by a piece of cardboard $e$ covered with paraffin and varnished. This piece of cardboard $e$ protects the composition against moisture and oxidation.

The member to be vulcanized is applied against the air tube to be repaired by means of the press illustrated, which comprises a yoke $f$ provided at its base with a small table $g$.

Under this table are provided ribs $h$, projecting to the same extent, so that this press maintains itself vertically if it is laid on a table. It can also be secured in a vise by clamping of one of the ribs.

The clamping is produced by means of a claw $i$ fitted with a slight play on a slotted head $j$ terminating a screw $k$. The latter is provided with a double screw-thread, this increasing the rapidity of the clamping. This screw carries a handle $l$ serving to operate it.

The screw $k$ is hollow and contains a striker $m$ terminating by a knob $m^1$ and pressing, through a shoulder $n$, on a spring $o$ within the bore of the screw the lower striated portion of which is passes in front of ferro-cerium stones $p$ contained in two conduits $q$ secured on the lower part of the screw $k$. The stones $p$ or other spark producing elements are pushed by springs $r$ adjusted by screws $s$.

It will be noted that for preventing the loss of these springs, they are each secured on a small head $u$ terminating each adjusting screw.

Figure 1:
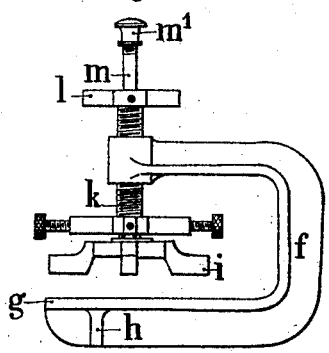
Fig. 1 is an elevation of the apparatus.
Figure 2:
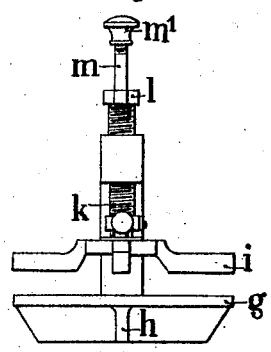
Fig. 2 is a side view.
Figure 3:
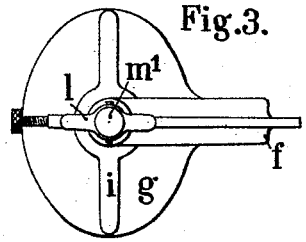
Fig. 3 is a plan view corresponding to Fig. 2.
Figure 4:
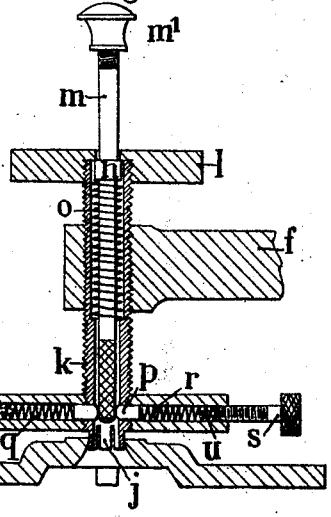
Fig. 4 is a vertical section on an enlarged scale.

The operation is as follows:

For effecting a repair, the damaged portion of the air tube $v$ (Fig. 3) or other member to be repaired, is cleaned. The covering washer $c$ is removed from a patch of the required shape, as well as the piece of cardboard $e$ impregnated with paraffin. The cup and the patch are placed on the air tube and the whole is inserted in the press, as shown in Fig. 3; the screw is then operated for suitably clamping the cup.

Owing to the freedom of movement of the claw, the latter can be inclined on one side or the other for compensating the differences of thickness, if any, and ensuring an equal clamping action on every side.

These preparations having been effected, a blow is struck on the head $m'$ of the striker. The sparks produced ignite the composition which burns during the required time by producing the temperature necessary for ensuring the vulcanization.

Immediately after cooling, the repaired air tube or other member can be used.

It will be noted that, owing to the combination of the two diametrically arranged tubes containing the ferro-cerium blocks, the rubbing member need not be guided at the level of the engagement points of these blocks. It results therefrom that about the rubbing member can be provided a large annular space permitting the easy passage of the sparks.

The arrangements described above are given by way of example only; all the details of execution and of realization, the forms, materials and dimensions can be varied without departing thereby from the principle of the invention.

Claims:

1. In a vulcanizer lighted and heated automatically, a clamping press, two diametrically arranged spark producing elements and a movable striker between said elements.

2. In a vulcanizer lighted and heated automatically, a clamping press, friction points comprising two diametrically arranged elements adapted to produce a spark by friction; a movable striker adapted to produce friction with said elements, and an annular space about the striker at the level of the friction points.

3. In a vulcanizer lighted and heated automatically, a clamping press, two diametrically disposed and opposed conduits mounted on the press, spark producing elements slidably mounted in the opposed ends of said conduits, and a movable striker between said elements.

The foregoing specification of my "vulcanizer" signed by me this 6th day of November 1925.

P. F. M. A. FONTANA.